United States Patent [19]

Havlovitz

[11] Patent Number: 5,570,814
[45] Date of Patent: Nov. 5, 1996

[54] COLLAPSIBLE BROADCAST SPREADER

[75] Inventor: Paul M. Havlovitz, Escondido, Calif.

[73] Assignee: Republic Tool & Mfg. Corp., Carlsbad, Calif.

[21] Appl. No.: 357,917

[22] Filed: Dec. 16, 1994

[51] Int. Cl.$^6$ ............................................. B67D 5/22
[52] U.S. Cl. .......................... 222/45; 222/255; 222/411; 222/474; 222/609; 222/611.1; 222/619; 222/625; 239/685
[58] Field of Search ........................... 222/45, 153.14, 222/609, 611.1, 613, 614, 619, 623, 624, 625, 235, 411, 473, 474; 239/669, 685, 689

[56] References Cited

U.S. PATENT DOCUMENTS

| | | | |
|---|---|---|---|
| 2,941,811 | 6/1960 | Sherer | 239/685 |
| 3,856,211 | 12/1974 | Williams | 222/609 X |
| 3,907,212 | 9/1975 | Ullom | 222/625 X |
| 4,106,704 | 8/1978 | McCloskey et al. | 239/685 |
| 4,281,780 | 8/1981 | Lagani, Jr. | 222/623 X |
| 4,665,469 | 5/1987 | Furfari et al. | 74/606 |
| 4,671,434 | 6/1987 | Johnston et al. | 222/625 |
| 4,681,265 | 7/1987 | Brabb et al. | 239/665 |
| 4,867,381 | 9/1989 | Speicher | 239/665 |
| 5,145,116 | 9/1992 | Shaver | 239/665 |
| 5,159,803 | 11/1992 | Earley, Jr. | 56/12.7 |
| 5,163,275 | 11/1992 | Hare et al. | 56/16.7 |
| 5,271,568 | 12/1993 | Stevie | 239/686 |

*Primary Examiner*—Joseph Kaufman
*Attorney, Agent, or Firm*—Harry Williams

[57] ABSTRACT

A collapsible broadcast spreader having a lower frame for supporting a wheel axle, an upper frame pivotally connected to the lower frame for use as a handle for the spreader when the upper frame and lower frame are in an extended position, a hopper also supported by the lower frame and having a materials exit aperture in the hopper, a slide integral with a bottom wall of the hopper, a shut-off plate disposed within the slide, a flexible cable having one end pivotally connected to the shut-off plate and the other end thereof connected to a control lever located on the upper frame for moving the shut-off plate from a closed position to an open position with respect to the aperture, wherein the control cable and the shut-off plate are in-line. Further provided are a rotor plate and a rotor shaft having a pinion gear fixedly mounted thereon, and a gear box housing having an upper half and a lower half split along a horizontal plane, the upper half of the gear box housing having a journal integrally and continuously formed therein for receiving the rotor shaft.

8 Claims, 4 Drawing Sheets

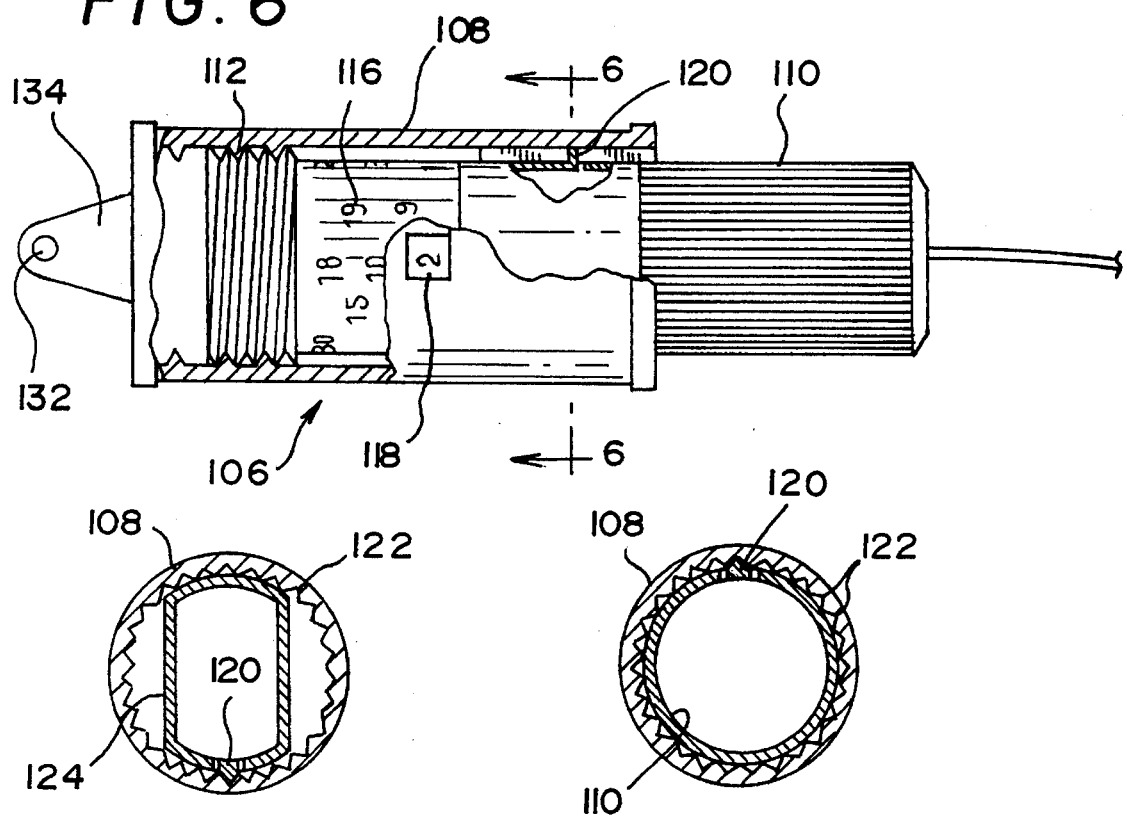
FIG. 6
FIG. 7B   FIG. 7A
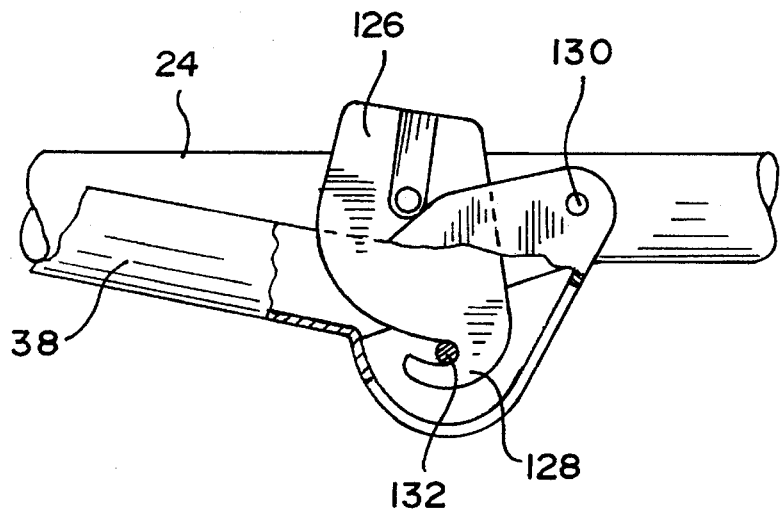
FIG. 8

COLLAPSIBLE BROADCAST SPREADER

BACKGROUND OF THE INVENTION

The present invention relates to portable spreaders of the broadcast kind which are supportable on a pair of wheels and which are manually pushed by the user thereof.

A spreader of this kind is disclosed in the U.S. Pat. No. 5,288,017 to Havlovitz, assigned to the assignee of the present invention, which disclosure is incorporated herein by reference. In the Havlovitz patent there is shown an articulated spreader having pre-assembled parts, including upper and lower frames having divergent leg members that can be assembled for use by the operator without the need of tools. The Havlovitz patent uses a manual pull cable for controlling the rate of flow of material from the spreader hopper, an accordion-like shut-off plate for opening and shutting the material exit escape at the bottom of the hopper, and a gear box housing disposed below the broadcast rotor plate.

In the case of the construction of a shut-off plate above-mentioned there is a need for providing a simple and efficient design which uses a minimum of moving parts and is reliable in operation. In the case of controlling the rate of flow of material from the hopper, there is a need also for a control mechanism which can vary the flow rate of material with both ease and a high degree of accuracy, and in the case of a gear box design, the heart of any broadcast spreader design, there is a need for a simple and efficient design with a minimum of moving parts that will allow error-free operation.

OBJECTS AND SUMMARY OF THE INVENTION

It is a primary purpose and principle object of the present invention to address the aforementioned needs and provide a completely pre-assembled fully featured portable wheeled broadcast spreader that is easily assembled into either a collapsed state for storage or an extended state for use and that requires no tools for assembly or disassembly, nor requires the removal of or the addition of any parts whatsoever, including controls, bolts and fasteners.

A further feature of the present invention is to provide a broadcast spreader that uses a simple two-part gear-box design having a simplified bearing element for the broadcast rotor shaft.

Another feature of the present invention is the provision of an easy thread-through of the wheel axle through the gear box.

Still another feature of the present invention is the provision of a simplified hopper shut-off plate that is essentially integral with the hopper and because of a linear in-line design offers reliable error-free operation.

Yet another feature of the present invention is the provision of a micrometer adjustment mechanism that is simplified in construction and easy to operate from the control lever handle and provides accurate error-free adjustment for the flowrate of material from the hopper to accommodate the type or size of the granules or seeds being used in the hopper.

Yet another feature of the present invention is the simplicity with which the various moving parts of the spreader are connected with each other, in particular the pivotal cable connection to the shut-off plate that can be snapped on or snapped off if so desired.

Still another feature of the present invention is a thumb-lock device for the flow-rate control handle that allows the operator to keep the hopper shut-off plate in its fully opened position without having to keep a hand on the control lever.

According to one embodiment of the present invention there is provided a collapsible broadcast spreader having a lower frame for supporting a wheel axle, an upper frame pivotally connected to the lower frame for use as a handle for the spreader when the upper frame and lower frame are in an extended position, a hopper also supported by the lower frame, a materials exit aperture in the hopper, a slide means integral with a bottom wall of the hopper, a shut-off plate disposed within the slide means, a flexible cable having one end pivotally connected to the shut-off plate and the other end thereof connected to a control lever located on the upper frame for moving the shut-off plate from a closed position to an open position with respect to the aperture, wherein the control cable and the shut-off plate are in-line. Further provided is a rotor plate and a rotor shaft extending through the rotor plate and the bottom wall of the hopper, an agitator member removably fixed to the end of the shaft extending into the hopper, the other end of the shaft having a pinion gear fixedly mounted thereon, a gear box housing having an upper half and a lower half split along a horizontal plane, the upper half of the gear box housing having a journal means integrally and continuously formed therein for receiving the rotor shaft, a ring gear having a sleeve member with a splined inner surface directed along the rotating axis of the ring gear and removably mounted on the wheel axle so that the ring gear occupies the gear box housing and engages the pinion gear, and the sleeve member is journaled between adjacently disposed half-circular apertures in the upper and lower halves of the gear box.

The invention will be better understood as well as further features, objects and advantages thereof become more apparent from the ensuing detailed description taken in conjunction with the drawings.

BRIEF DESCRIPTION OF THE DRAWINGS

FIG. 6 is schematic cross-sectional detail of the micrometer adjustment control according to the invention;

FIG. 7A is a cross section taken along along lines 6—6 in FIG. 6;

FIG. 7B shows an alternative embodiment to the structure shown in FIG. 7A; and

FIG. 8 is a schematic view of the thumb-lock mechanism for the control lever, according to the invention.

DETAILED DESCRIPTION OF THE PREFERRED EMBODIMENTS

Figure 1:
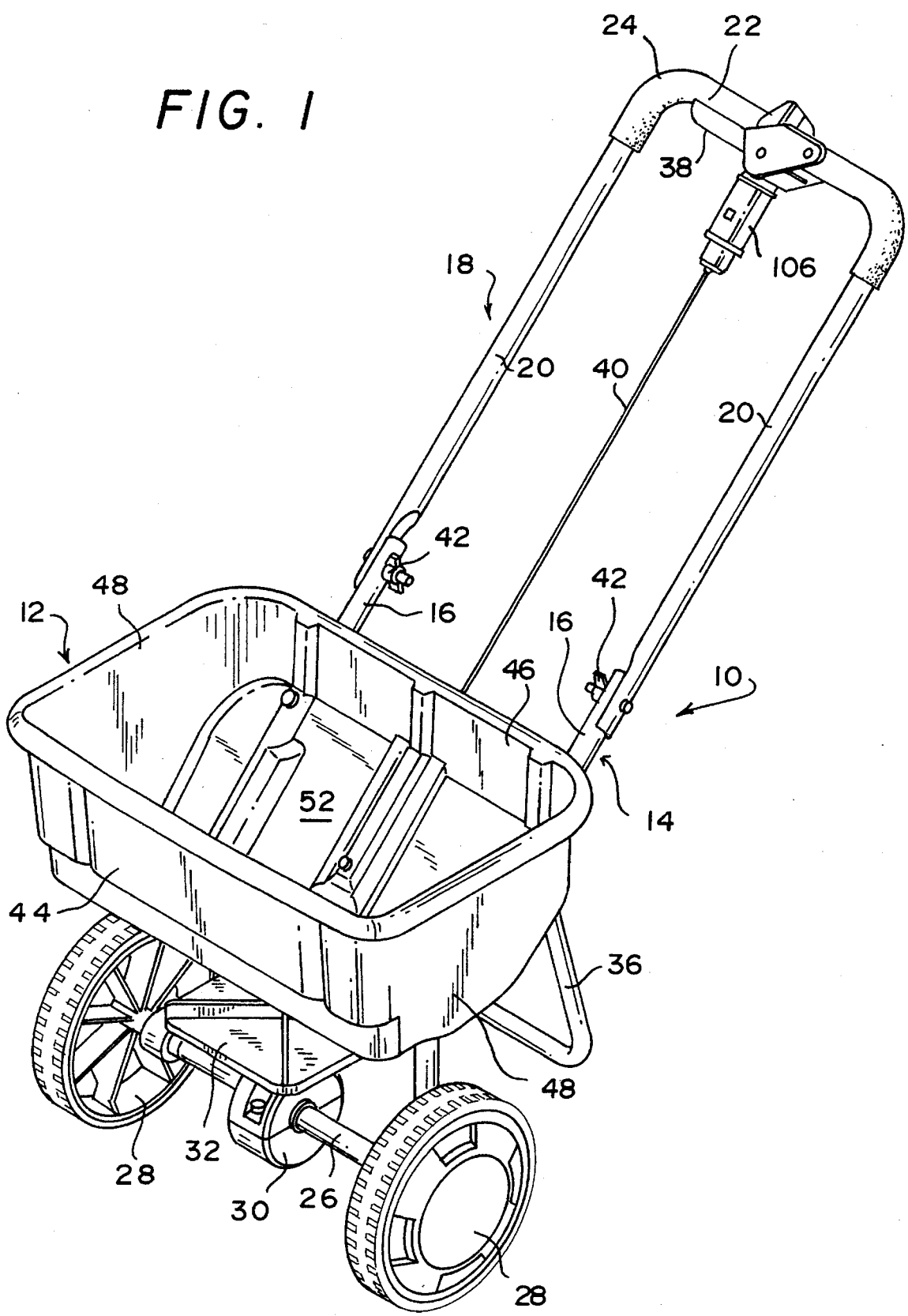
FIG. 1 is a schematic perspective view of the portable wheeled broadcast spreader in its extended state according to the invention.

Referring now to FIG. 1 there is shown a broadcast spreader 10 having a hopper 12, a lower frame 14 having generally parallel leg members 16, an upper frame 18 having generally parallel leg members 20 and a handle portion 22 which is covered with a suitable sleeve of foam material 24 for enhancing comfort and gripping action. Also shown is an axle 26 and a pair of wheels 28 supported by the axle. A gear box 30 is supported and operated by the axle (to be described below), and a broadcast rotor plate 32 which is turned by a rotor shaft 34 (see FIG. 2) extends from the gear box. A support stand 36 (see also FIG. 2) is shown extending from the underside of the hopper 12 to thereby support the hopper in an upright position. Also shown is a control lever 38 pivotally connected to the handle 22, which lever controls the flexible cable 40 for operating the shut-off plate to be explained below. Fasteners 42 are shown securing the pivotal connection between the lower legs 16 and the upper legs 20 of the lower and upper frames respectively which are shown in their extended state. Fasteners 42 are similar in design to those described in the U.S. Pat. No. 5,064,325 to McRoskey, having the same assignee as the present invention, the disclosure of which is incorporated herein by reference.

Figure 2:
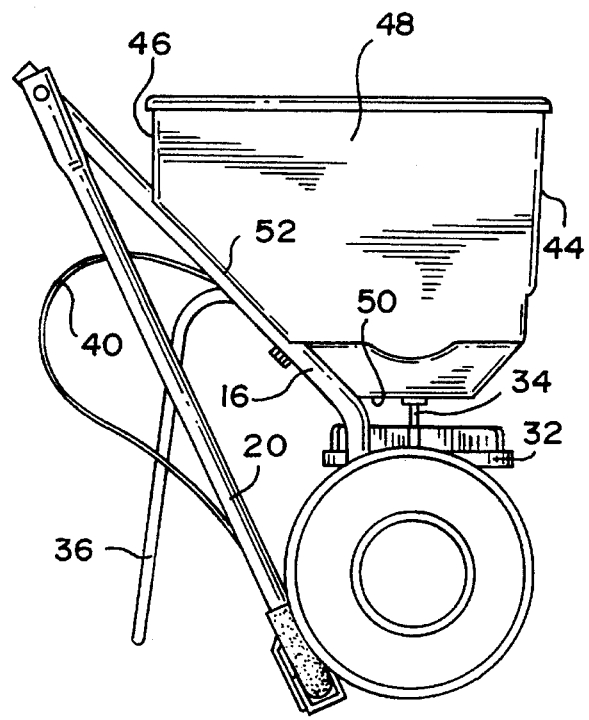
FIG. 2 is a schematic side elevation view of the spreader shown in FIG. 1 in its collapsed state.

FIG. 2 shows the upper frame 18 pivoted to a collapsed state, in which the flexible cable 40 for controlling the shut-off plate is allowed to bend to thereby accommodate the upper frame being pivoted to its collapsed state so that the spreader can be stored in a confined space, such as a closet, the back of a truck or the trunk of a car.

The hopper 12 is molded from a suitable plastic material and is seen to be a six-sided vessel (see FIGS. 1 and 2) having a front wall 44, a back wall 46, two side walls 48, a bottom wall 50 and a sloping wall 52 connecting the bottom wall 50 and the back wall 46.

Figure 3:
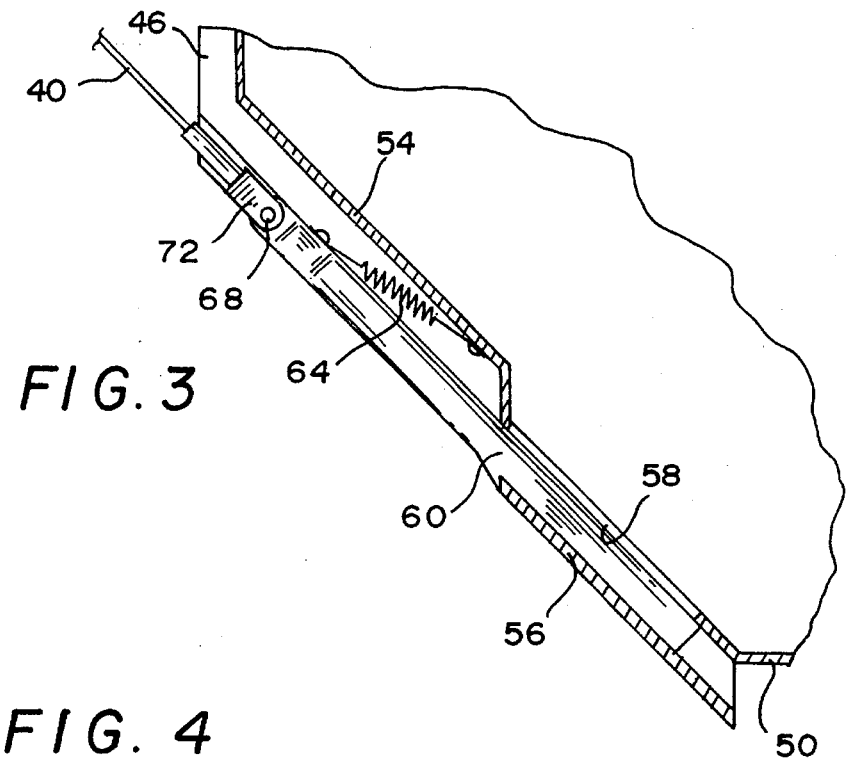
FIG. 3 is a schematic cross-sectional view of the slide mechanism according to the invention.
Figure 4:
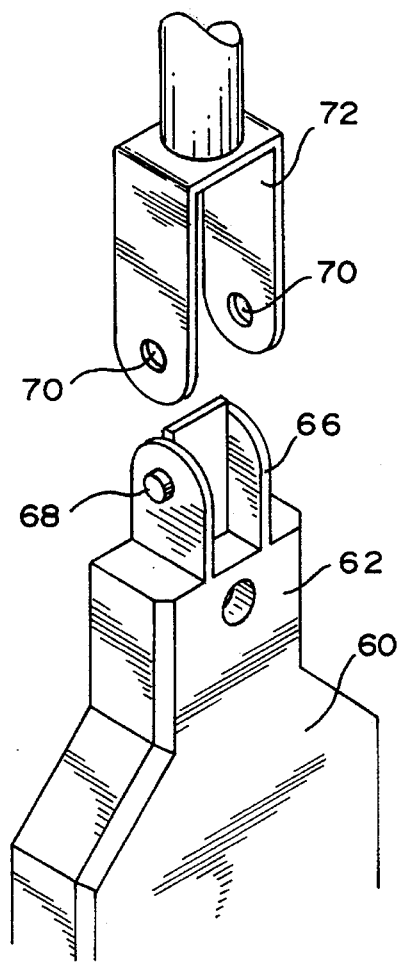
FIG. 4 is a schematic perspective of the details of the pliable connection between the cable and the slide shown in FIG. 3.

Integrally molded with the sloping bottom wall 52 of the hopper 12 is a slide structure 54, 56, as best shown in FIG. 3. Opposite the slide structure 56 is a materials exit aperture 58 in the wall 52 for allowing egress of the seed or granular material in the hopper. Slidably mounted in the slide structure 54, 56 is a slide member 60 (see FIG. 4) that in its fully extended position covers the aperture 58, as shown in FIG. 3. The yoke portion 62 of the slide 60 is connected by a spring 64 to a section of the slide structure by a suitable means. Also provided on the yoke portion 62 is an extension portion 66 having a pair of oppositely disposed lug members 68, one of which is shown in FIG. 4. These lug or stud members fit into the respective holes 70 of a pliable U-shaped member 72 which is pivotally connected by a suitable means to the cable 40. Thus the cable 40 can be snapped onto the slide member 60 by spreading apart the legs of the U-shaped member 72 so that the holes 70 fit into place over the studs 68. Because these parts are molded from a plastic material there is more than sufficient flexibility between the parts so that they move with respect to one another in a relatively friction-free manner.

Figure 5:
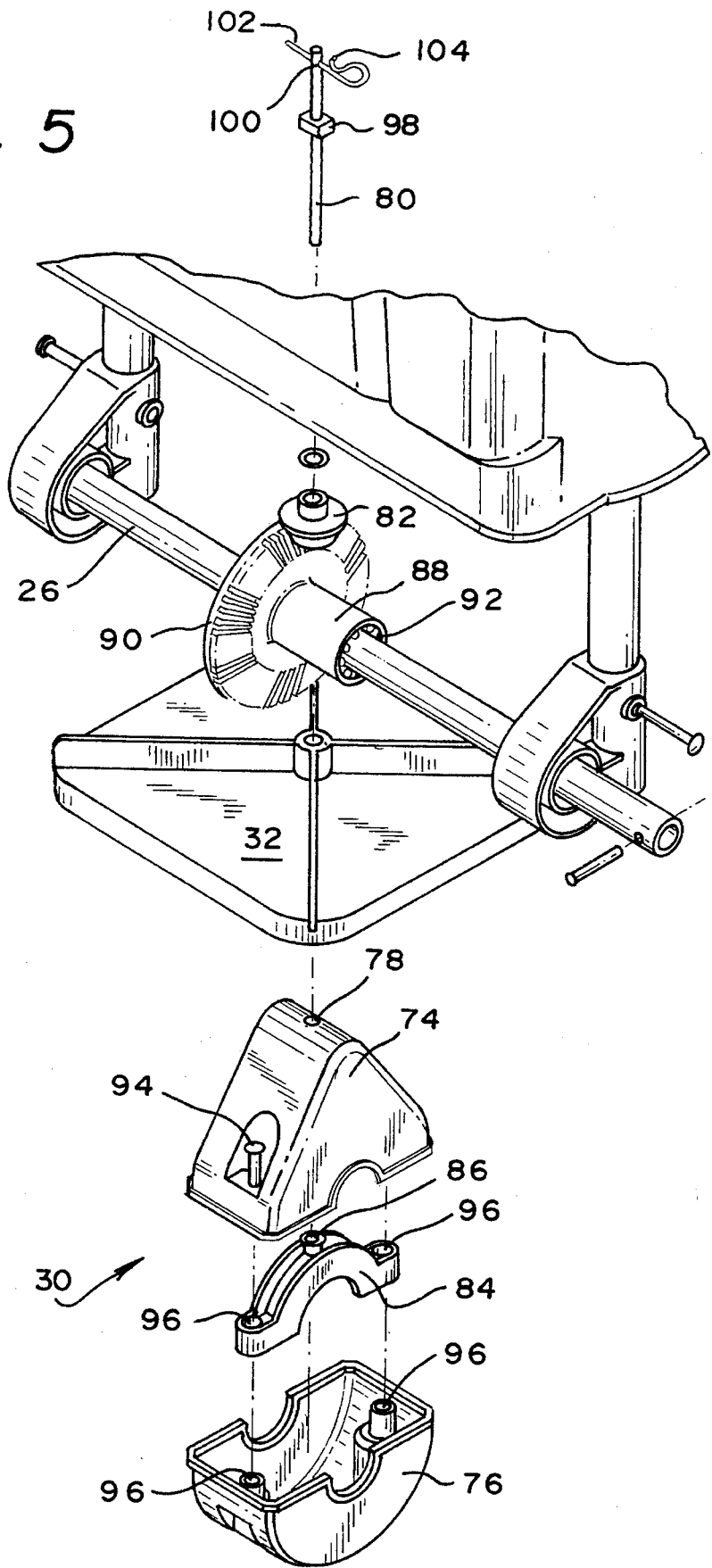
FIG. 5 is a schematic explosive of the gear box according to the invention.

The details of the gear box 30 are shown in FIG. 5. The gear box is shown to be composed of two halves 74, 76 which are split along a horizontal plane. This arrangement allows the upper half 74 to be integrally formed with a continuous hole or journal 78 through which extends a rotor shaft 80 that in turn fixedly supports the rotor plate 32 by means of a suitable bushing at the center of the rotor plate. A vertically split housing would require, of course, a split hole or journal, in which case uneven wear between the rotating shaft and the split hole would result in eventual breakdown. The lowermost end of the rotor shaft is fixedly connected to and at the same time passes through a pinion gear 82 and comes to rest in a bearing support 84. This last element is provided with a bearing recess or hole 86 for receiving the lower end of the rotor shaft 80. The bearing support 84 is arcuately shaped so as to straddle the sleeve member 88 of a ring gear 90. With this arrangement the pinion gear and rotor shaft are held in positive engagement with the ring gear which itself is fixedly supported by the axle 26. Towards this end the sleeve member 88 is provided with an interior surface having splines 92 throughout its inner circumference. The axle is provided with one or more exteriorly extending complementary splines that allows the axle to be threaded through the sleeve of the ring gear at any rotary angle. The two halves 74, 76 of the gear box housing, together with the bearing support element 80 are secured as an integral unit by means of suitable screw means 94 passing through the screw holes 96 in the respective halves 74, 76 and aligned holes in the bearing support element, as shown in FIG. 5.

Disposed on the upper part of the rotor shaft 80 is rotor bushing 98 which is affixed in the bottom wall of the hopper 12 to thereby rotatably support the rotor shaft 80 at the upper part thereof and allow it to extend within the interior space of the hopper. At the topmost end of the rotor shaft 80 there is a transaxial hole 100 for receiving an agitator pin or clip 102 that has a hooked free end 104 and that can be biased from the main stem of the pin so as to hook around the rotor shaft once the pin is passed through the hole 100 to thereby hold the agitator pin in place.

A micrometer adjustment device 106 (see FIG. 1) is disposed between the control lever handle 38 and the flexible cable 40 and allows for accurate error-free adjustment for the flowrate of material from the hopper by adjusting how far the shut-off plate 60 slides past the aperture 58. Determining this distance depends upon the type or size of the granules or seeds being used in the hopper. The micrometer adjustment device is composed of two parts, a cylinder 108 and a barrel portion 110 that threads into the cylinder and varies the overall length of the cylinder-barrel combination depending upon how much the barrel is rotated with respect to the cylinder, thus varying the pull length of the cable 40 and hence the amount the slide 60 extends past the aperture 58 when the cable is pulled by pivoting the control lever. A somewhat similar device can be seen in FIG. 3 of the U.S. Pat. No. 4,106,704 to McRoskey et al, which disclosure is incorporated herein by reference. In the present case the barrel 110 is seen to have a screw-threaded end portion 112 which engages a threaded interior in the cylinder 108. Surrounding a middle portion of the barrel are a series of indicia 116 in which each separate number is designed to appear in a window 118 in the cylinder; each number corresponding to a particular size opening in the materials exit aperture. In the middle portion of the barrel there is disposed a pliable detent member 120 which bears against a serrated or ratcheted inner surface 122 of the cylinder 108 (see FIG. 7A), so that when the barrel 110 is rotated by the user to adjust the length of the cable, a clicking noise is heard and incremental rotation is felt, by means of which the adjusted setting is fixed into place until such time as further adjustment is made. In FIG. 7B the front portion of the barrel 124 is shown to have an oval cross-section for facilitating turning of the barrel by hand.

In FIG. 8 a thumb-lock mechanism 126 is shown for the purpose of providing a lock-on control of control lever 38 when it is fully engaged or pulled into the handle 24 for the pull of the shut-off slide to its opened position. The thumb lock device is a U-shaped member that is pivoted by means a suitable pin 128 to the handle 24 adjacent to where the control lever is pivoted by pin 130 to the handle. The ears or free ends of of the U-shaped member 126 terminate in hooked portions 128, one of which is shown hooked around pin 132 that slots into bracket 134 (see FIG. 6) on the cylinder portion of the micrometer adjustment device 106. Thus, when the control lever 38 is pulled up against the handle 24 for opening of the aperture in the hopper, the thumb-lock member 126 can be pivoted by means of the user's thumb so as to rotate the hooked portions 128 around the pin 132, thereby locking the control lever in place until such time as the thumb lock is pivoted in a reverse direction to free the lever 38.

The foregoing relates to a preferred exemplary embodiment of the present invention, it being understood that other embodiments and variants thereof are possible within the scope of the invention, the latter being defined by the appended claims.

What is claimed and desired to be secured by Letters Patent of the United States is:

1. A collapsible broadcast spreader having all pre-assembled parts comprising, a lower frame having spaced apart leg members and an axle and wheel means connected thereto, an upper frame pivotally connected to said spaced apart leg members of said lower frame for use as a handle for said spreader when said upper frame and lower frame are in an extended position, fastener means for tightening and loosening the pivotal connection between said upper and lower frames, a generally rectangular shaped hopper connected to said lower frame having a front and a back wall, a pair of side walls, a bottom wall, and a further wall extending between said back wall and said bottom wall, said further wall having a slope paralleling the slope of said lower frame and said upper frame when said frames are in said extended position, said further wall having a materials exit aperture, a slide means integral with said further wall of said hopper, a shut-off plate disposed within said slide means, spring means biasing said shut-off plate into a position extending over said aperture, and a rotor plate disposed below said hopper, including drive means for rotating said rotor plate, and a flexible cable having one end pivotally connected to said shut-off plate and the other end thereof connected to a control lever located on said handle of said upper frame for moving said shut-off plate via said cable from a closed position to an open position with respect to said aperture, said cable and said shut-off plate being linearly in-line when said upper and lower frames are extended.

2. A collapsible spreader according to claim 1, wherein said drive means further comprises a rotor shaft extending through said bottom wall of said hopper, an agitator member removably fixed to the end of said shaft extending into said hopper, the other end of said shaft having a pinion gear fixedly mounted thereon, a gear box housing having an upper half and a lower half split along a horizontal plane, said upper half of said gear box housing having a journal means integrally and continuously formed therein for receiving said shaft, a ring gear having a sleeve member with a splined inner surface directed along the rotating axis of said ring gear and removably mounted on said axle means, said ring gear occupying said gear box housing and engaging said pinion gear, and said sleeve member journaled between adjacently disposed half-circular apertures respectively in said upper and lower halves of said gear box.

3. A collapsible broadcast spreader according to claim 1, wherein there is further provided a micrometer adjustment means connected between said control lever and said flexible cable for varying the size of the opening said shut-off gate makes with said aperture, said micrometer adjustment means including a cylinder portion connected to said control lever and having a window therein, a barrel member connected to said flexible cable and threaded into said cylinder, said barrel member having spirally arranged indicia thereon for appearing in said window as said barrel is turned with respect to said cylinder, and pliable means on said barrel member for engaging a ratchet means disposed on the interior surface of said cylinder for effecting incremental rotary motion when said barrel member is rotated.

4. A broadcast spreader according to claim 3, wherein a portion of said barrel member is non-circular in cross-section for facilitating rotation thereof.

5. A collapsible broadcast spreader having all pre-assembled parts comprising, a lower frame having an axle and wheel means connected thereto, an upper frame pivotally connected to said lower frame for use as a handle for said spreader when said upper frame and lower frame are in an extended position, fastener means for tightening and loosening the pivotal connection between said upper and lower frames, a hopper connected to said lower frame, a materials exit aperture in said hopper, a slide means integral with a bottom wall of said hopper, a shut-off plate disposed within said slide means, spring means biasing said shut-off plate into a position extending over said aperture, a rotor plate disposed below said hopper, a rotor shaft extending through said rotor plate and said bottom wall of said hopper, an agitator member removably fixed to the end of said shaft extending into said hopper, the other end of said shaft having a pinion gear fixedly mounted thereon, a gear box housing having an upper half and a lower half split along a horizontal plane, said upper half of said gear box housing having a journal means integrally and continuously formed therein for receiving said shaft, and a ring gear having a sleeve member with a splined inner surface directed along the rotating axis of said ring gear and removably mounted on said axle means, said ring gear occupying said gear housing and engaging said pinion gear, and said sleeve member journaled between adjacently disposed half-circular apertures respectively in said upper and lower halves of said gear box.

6. A collapsible spreader according to claim 5, wherein there is further provided a bearing means for said rotor shaft disposed in said gear box and straddling said sleeve member for supporting the other end of said rotor shaft.

7. A collapsible broadcast spreader according to claim 5, wherein there is further provided a micrometer adjustment means connected between said control lever and said flexible cable for varying the size of the opening said shut-off plate makes with said aperture, said micrometer adjustment means including a cylinder portion having a window therein, a barrel member threaded into said cylinder, said barrel member having spirally arranged indicia thereon for appearing in said window as said barrel is turned with respect to said cylinder, and pliable detent means on said barrel portion for engaging a ratchet means disposed on the interior surface of said cylinder for effecting incremental rotary motion when said barrel portion is rotated.

8. A collapsible spreader according to claim 5, wherein said hopper has a front and a back wall, a pair of side walls, and a further wall extending between said back wall and said bottom wall, said further wall having a slope paralleling the slope of said lower frame and said upper frame when said frames are in said extended position.

* * * * *